(12) United States Patent
Stingl

(10) Patent No.: US 6,464,442 B1
(45) Date of Patent: Oct. 15, 2002

(54) SAFETY RELEASE FASTENERS

(75) Inventor: David A. Stingl, Great Falls, VA (US)

(73) Assignee: O.I.A., LLC, VA (US)

( * ) Notice: Subject to any disclaimer, the term of this patent is extended or adjusted under 35 U.S.C. 154(b) by 519 days.

(21) Appl. No.: 08/865,162

(22) Filed: May 29, 1997

Related U.S. Application Data

(60) Provisional application No. 60/018,811, filed on May 31, 1996.

(51) Int. Cl.[7] ............................ F16B 35/00; F16B 23/00
(52) U.S. Cl. ........................................ 411/390; 411/396
(58) Field of Search .......................... 411/390, 396, 411/5, 2, 3; 29/426.1, 426.5

(56) References Cited

U.S. PATENT DOCUMENTS

| | | | | |
|---|---|---|---|---|
| 1,039,576 A | * | 9/1912 | Mueller et al. | |
| 1,394,608 A | * | 10/1921 | Davern | |
| 2,346,769 A | * | 4/1944 | Lichtor | |
| 3,055,100 A | * | 9/1962 | Kimpel | |
| 3,119,298 A | * | 1/1964 | Brown | |
| 3,258,887 A | * | 7/1966 | Mostoller | |
| 3,832,747 A | * | 9/1974 | Nankivell, Jr. et al. | |
| 3,902,400 A | * | 9/1975 | Knicheloe et al. | |
| 4,904,145 A | * | 2/1990 | Koutsoupidis | 411/396 |
| 4,964,773 A | * | 10/1990 | Schmidt | 411/396 |
| 5,426,905 A | * | 6/1995 | Rollhauser et al. | 411/396 |

* cited by examiner

*Primary Examiner*—David P. Bryant
(74) *Attorney, Agent, or Firm*—James Creighton Wray; Meera P. Narasimhan

(57) ABSTRACT

A safety device provides quick and easy removal or separation of a part or assembly from a machine or installation base. The safety release fasteners that secure the part or assembly to the machine or installation base have interconnected sections that are releasable by simply tugging on the part or assembly to allow the sections to snap apart. The breaking of the fastener releases the part or assembly from the machine or installation base, thereby freeing from imminent danger the person, whose hair, clothing or limb may be caught. Axial separation of the fasteners prevent injury to a person or damage to a machine or installation base or to a part or assembly, such as when a large inanimate object is drawn into an intake of a machine or installation.

21 Claims, 2 Drawing Sheets

SAFETY RELEASE FASTENERS

BACKGROUND OF THE INVENTION

This application claims the benefit of U.S. Provisional Application No. 60/018,811, filed May 31, 1996.

The invention relates to safety devices, primarily fasteners such as, for example, screws, bolts, pins, rivets. The invention has particular use with equipment or installations where personal safety is at issue such as, for example, in agricultural equipment, industrial machines and recreational installations.

In one example, persons with long hair swimming by drains in swimming pools, spas and hot tubs may have their hair pulled into the drain grates. When a vortex exists in the drain sometimes the hair is twisted, causing the hair to become entangled in the drain grate. When substantial hair is so entangled, removal becomes difficult and a hair entrapment on the drain grate becomes a possibility. Serious injury or drowning may result.

Anti-vortex fittings have been installed in drains to prevent twisting of hair, but the anti-vortex fittings may not always be successful in preventing the formation of a vortex or currents which tend to twist the hair and entrap the hair on the drain.

Proposals have been made that swimming pool attendants be equipped with shears to cut hair in case of entanglements, but those proposals are not realistic in view of the difficulty of dealing with a struggling person whose hair is entrapped while being held underwater.

A need exists for a safety device which will reduce drowning from accidental hair entrapments in drains.

Other examples may be in agricultural harvesters or industrial machinery in which clothing or limbs may become engaged or any blockage may become lodged, with attendant dangers to the persons or machinery.

SUMMARY OF THE INVENTION

In one example, the invention provides a new drain fastener which is torsionally strong and axially weak so that a drain grate may be fastened in place with the fastener, and the drain grate is quickly removed with minimal axial force on the fasteners.

A safety device is designed to prevent entrapments and entanglements in swimming pool, spa and hot tub drain grates. The safety product is a screw strong in torque but weak in axial tension. The screws are retrofittable on all existing drains, as well as available to be incorporated into all new drains. The screw may be made of any suitable material such as plastic or corrosion-resistant metal.

The screw assembly has a connector with a blade in a socket, polygonal projections and sockets, or a multiple pin system that would allow for strong torque for installing and removing. A weaker axial separation strength, in ft. lbs, would be determined by testing to see how much force is needed for a small child or elderly person to shear the bond between parts of screws. An extraction wrench is available to extract studs if a tensional shear release ever happens.

Various size pins are provided through the two-part screw to vary tensional shear strength.

A preferred pool, spa and hot tub drain grate safety apparatus for preventing injury due to entrapments and entanglements in drain gratings has a drain grate and fasteners for connecting the drain grate to a drain on a pool base. Preferably, each fastener has first and second sections, the first and second sections being releasably connected for quick release of the sections and of the drain grate from the pool base on applying a pressure on the fasteners.

Preferably, extensions are provided on the drain grate, and openings in the extensions complementary to openings along the drain in the pool base for receiving and holding the fasteners and fastening the drain grate on the drain.

In preferred embodiments of screws, bolts, pins and other fasteners used in large machinery or installations, first and second sections of the fasteners have torque transmitting connections between the sections for withstanding strong torque between the sections during installation or removal and for separating axially upon applying a force to release the guards or parts from the main machinery or installation.

Preferably, the fasteners have at least two portions. The first portions are preferably formed for sliding through an opening and may have heads or end connectors such as nuts or cotter pins to prevent further sliding. Recesses or shapes are provided on the heads for receiving connectors or driving devices.

The portions on the second section may be formed as threaded portions for engaging complementary threaded openings along a base or for engaging threaded nuts for holding parts or assemblies of the machines or installations together. Connectors include projections and complementary receivers in the first and second sections for releasably engaging the first and second sections upon excess axial force.

Preferably, the connectors are axial projections and the receivers are complementary recesses for holding first and second sections together and permitting transmission of torque between the sections without allowing the sections to separate.

In preferred embodiments, the connectors are projections and the receivers are complementary sockets for holding the first and second sections together by a friction fit.

A tool is preferably provided for engaging a recess or projection on the second section and for removing the second section from its installation position after separation from the first section. The tool may be any tool such as an extraction wrench.

The fasteners are made of any suitable material such as plastic, corrosion-resistant metal, or the like. The fasteners may have a corrosion-resistant coating.

In an example of a preferred method for easily removing a drain grate from a pool, spa or hot-tub base fasteners are provided with releasable first and second sections for connecting the drain grate to the base. When an axial force is exerted on the drain grate, it causes separation of the first and second sections of the safety release screws in response to the axial force, and releases the drain grate from the base in response to the separation of the fasteners.

In a preferred embodiment, safety fasteners comprise upper and lower sections and an axially releasable, torque transmitting connection between the upper and lower sections for withstanding a strong torque between the sections during installation in pool, spa, or hot-tub bases and for easy separation of the sections upon applying a force.

Preferably, lower sections have threads for engaging complementary threads in openings in the pool base. The upper sections preferably have radially extending heads for preventing passage of the heads through openings in drain grates. The drain grates have grate openings and the heads have shapes for receiving driving devices. Cylindrical recesses are provided in the upper sections and axial pins in the lower sections for engaging the recesses and for holding the first and second sections together permitting transmission of torque between the sections without allowing the sections to separate.

In an example of a preferred pool, spa and hot tub drain grate safety apparatus for preventing injury due to entrapments and entanglements in drain gratings has a drain grate, a frame on the drain grate, screw openings in the frame for aligning with threaded screw receiving holes in a pool base, safety release screws in the screw openings, safety release screws having upper and lower sections, the lower sections having threads for engaging with the threaded screw receiving holes in the pool base, the upper sections having radially extended heads for preventing passage of the heads through the screw openings in the grate frame, the heads having recesses for receiving an appropriate screw driver, and axially releasable, torque transmitting connections between the upper and lower sections for withstanding strong torque between the sections required for installing the screws in the threaded screw receiving holes in the pool base and for separating upon axial force and thereby releasing the upper sections from the lower sections and the grate from the pool base.

A preferred method of removing fasteners includes providing releasable upper and lower sections on fasteners, exerting an axial force on the fastener for quickly releasing the upper and lower sections and disengaging the fastener.

Preferably, the torque transmitting connections of the safety release screws include aligned axially offset recesses in the upper and lower sections and axial pins inserted in the recesses for holding the sections together permitting transmission of torque between the sections and allowing the sections to separate axially.

The torque transmitting connections of the safety release screws further comprise projections on tops of the lower sections and sockets in the bottoms of the upper sections. Alternately the projections may be provided on the upper sections and the sockets in the lower sections.

Preferably, an extraction wrench has a complementary projection for inserting in the sockets and twisting of the lower sections for removal of the separated lower sections of the screw from the screw holes in the pool base.

A preferred method for removing a part of assembly from a machine base includes pulling on the part or assembly, causing an axial force on safety release fasteners holding the part or assembly on the machine base, separating upper and lower sections of the safety release fasteners with the axial force, and releasing the part or assembly from the machine base in response to the separating of the safety release fasteners.

Preferred safety release fasteners include upper and lower sections. The lower sections have threads for engaging with the threaded screw receiving holes or nuts in the machine base. The upper sections have heads with radially extended engagements for preventing passage of the heads through the screw openings in parts or assemblies and the heads having shapes for receiving a driver. Axially releasable, torque transmitting connections between the upper and lower sections withstand strong torque between the sections required for installing the fasteners in the threaded screw receiving holes or nuts in the machine or installation base and separate upon excess axial force. Frictional surfaces in the torque transmitting sections hold the fasteners together during installation and release the sections upon excess axial force.

These and further and other objects and features of the invention are apparent in the disclosure, which includes the above and ongoing written specification, with the claims and the drawings.

DETAILED DESCRIPTION OF THE PREFERRED EMBODIMENTS

Figure 1:
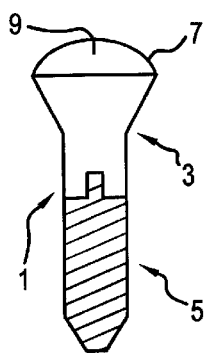
FIG. 1 a side elevation of a new screw.

Referring to the drawings, FIG. 1 shows as one example a screw 1 with an upper portion 3 and a lower portion 5. The upper portion has an enlarged head 7 with a groove or depression 9 for receiving any appropriate form of driver.

As seen in FIG. 1, the shank 11 of the upper portion has a lower surface 13 which is flat, sloped or rounded to cooperate with the upper surface 15 of the lower portion 5. The upper portion 3 has a recess 17, which receives a projection 19 on the lower screw body 5. The projection 19 is secured in the recess 17 by a friction fit or by bonding in such a manner as to maintain the upper and lower elements 3 and 5 aligned while permitting their axial disengagement.

The retention of the head end and threaded end together during installation and normal use may be provided by friction, or by adhesion or interfitting projections, for example barbs or detents, and balls and sockets in the projections and recesses. Shear pins may extend transversely through the recesses and projections.

Figure 3:
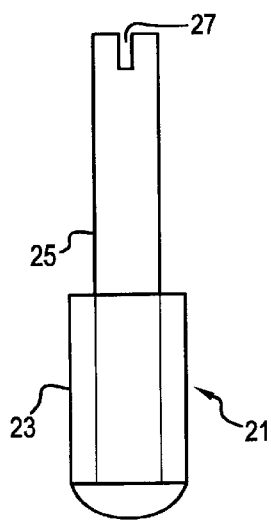
FIG. 3 is a side elevation of a tool for removing the screw stub or stud.

The screw fastener 1 is inserted with a conventional screwdriver of any form such as, for example, a slot, Phillips head or star driver. A special wrench 21 is provided, as shown in FIG. 3, for extracting the lower portion 5 of the screw after the screw has been axially disassembled. The tool 21 has a handle 23, a shaft 25 and a socket 27 which receives the projection 19 on the lower portion of the screw.

Twisting the lower section removes it from the opening. Disassembly may be by pulling upward (axial force) on a drain to which the screw is attached.

Figure 2:
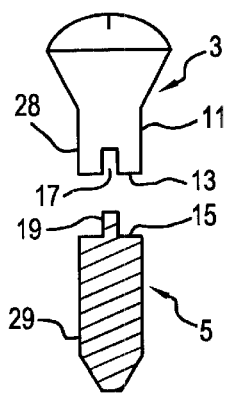
FIG. 2 is a side elevation of a new screw after separation, such as caused by pulling up on a drain grate after hair entrapment has occurred.
Figure 4:
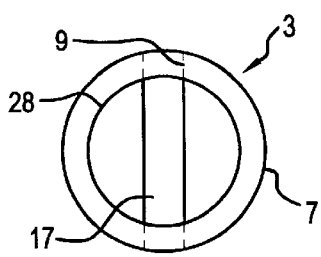
FIG. 4 is a bottom view of the upper portion of the screw shown in FIG. 2.
Figure 5:
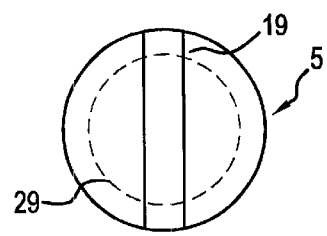
FIG. 5 is a top view of the lower portion of the screw shown in FIG. 2.

FIGS. 4 and 5 show a bottom view of the top portion 3 and a top view of the bottom portion 5, respectively. Threads 29 are shown on the bottom portion, and projection 19 is shown with a flat top. The top may be of any shape commensurate with the top of the recess 17 in the upper portion. As shown in FIG. 4 and FIG. 2, the recess 17 is formed in an unthreaded shank portion 28 of the upper part 3 of the screw. The projection 19 and the recess may be of any shape that prevents relative turning and transfers torque, for example a triangle, square, pentagon, hexagon, etc.

Figure 6:
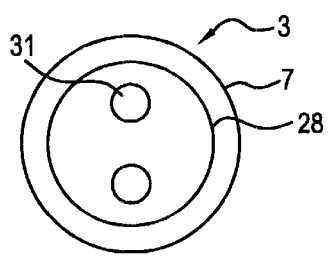
FIG. 6 is a bottom view of an upper portion of a screw with axial receivers for connector pins which provide torsional strength to the screw.
Figure 7:
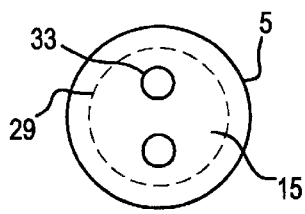
FIG. 7 is a top view of the lower portion of the screw shown in FIG. 2 with axially extending pins mounted in axially extending receivers in a lower portion of the screw.

FIGS. 6 and 7 show an alternate embodiment in which the shank 28 of the upper portion 3 of the screw has two or more recesses 31 for receiving pins 33, which extend upward from recesses in the top 15 of the lower portion 5 of the screw.

Figure 8:
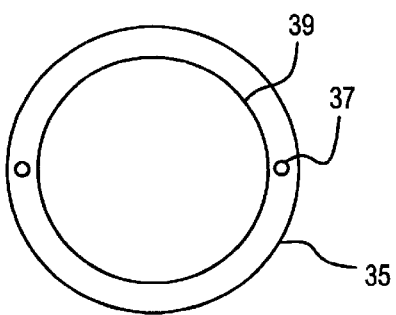
FIG. 8 is a top view of a drain opening with threaded holes for securing a drain grate.

FIG. 8 is a plan view of a top of a drain 35 in which openings 37 are formed and threaded to receive screws which hold a drain grate in position on the drain opening 39. Usually the drain top 35 is a pre-cast member which is embedded in the structure of the pool.

Figure 9:
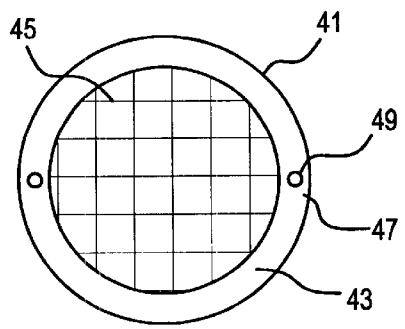
FIG. 9 is plan view of a drain grate with holes for receiving fasters.

As shown in FIG. 9, the drain grate 41 has a frame 43 with cross elements 45 which may be strips or a flat plate with circular openings, or a screen. Recessed areas 47 are provided at the sides of the frame 43. Openings 49 allow the threads of a screw and the shank of a screw to pass, but restrict the passage of the head of the screw when the grate 41 is fastened to the drain top 35.

Regular screws tightly fix the drain grate 41 to the top of the drain 39, and as water rushes through the openings 45, hair may flow along with the openings into the drain. A swirling action within the drain may cause long hair of a swimmer to become entangled on the bottom side of the drain openings 45, entrapping the hair of the swimmer. With the new screws, the swimmer may push on the bottom of a swimming pool, spa or hot tub with sufficient force to cause the screws to axially separate, pulling the drain grate 41 and the upper portions 5 of the screws out of the drain and releasing the swimmer from entrapment.

Figure 10:
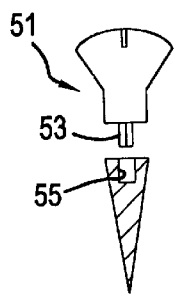
FIG. 10 is and example of a polygonal projection and recess.

FIG. 10 shows a safety release screw 51 with a triangular projection 53 and recess 55.

Figure 11:
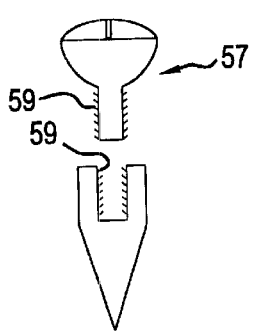
FIG. 11 shows roughened surfaces, barbs or detents on a plastic fastener.

FIG. 11 shows a plastic safety release screw 57 with barbs 59 in the recess and on the projection.

Figure 12:
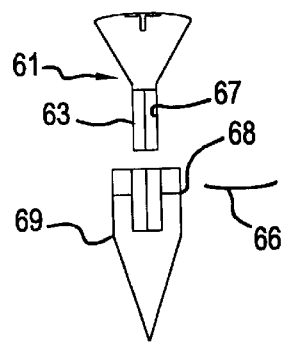
FIG. 12 shows a shear pin inserted in transverse aligned openings through the recess and projection.

FIG. 12 shows a safety release screw 61 with square projection 63 and recess 65, and a shear pin 66 that extends through aligned openings 67 and 68 in the projection 63 and lower section 69, respectively. The shear pins are selected from pins having different diameters or thicknesses and pins having different compositions for controlling axial force limits which shear the shear pins and allow axial separation of the first and second sections.

Figure 13:
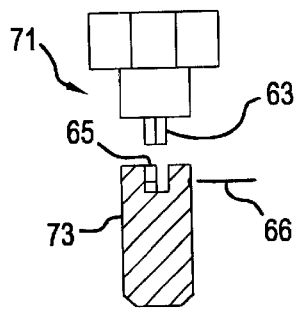
FIG. 13 shows a safety release bolt.

FIG. 13 shows a safety release bolt 71 with a square projection 63 and recess 65, and a shear pin 66 which extends through aligned transverse openings in the projection and lower threaded section 73.

Figure 14:
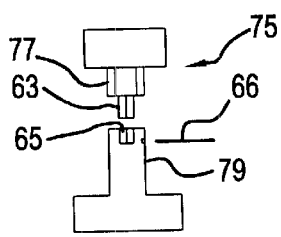
FIG. 14 shows a safety release rivet.

FIG. 14 shows a safety release rivet 75 with a polygonal projection 63 on the upper section 77, and a complementary polygonal recess 65 in the lower section 79.

Figure 15:
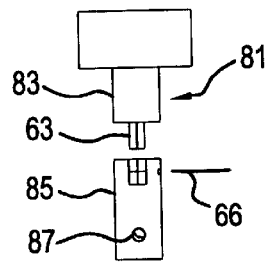
FIG. 15 shows a safety release pin with a shear pin.

FIG. 15 shows a safety release pin 81 with smooth sided upper and lower sections 83 and 85, a shear pin that fits in aligned openings in lower section 85 and projection 63. A transverse opening 87 receives a keeper or cotter.

Figure 16:
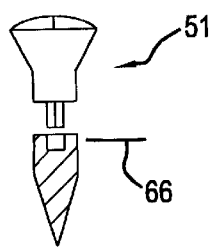
FIG. 16 shows a safety release screw with a shear pin.

FIG. 16 shows a safety release screw 51 with a shear pin 66.

Figure 17:
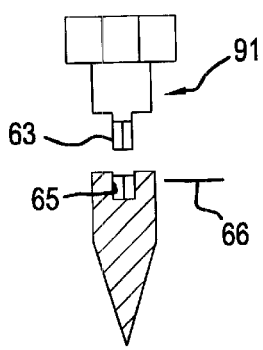
FIG. 17 shows a safety release lag screw with a shear pin.

FIG. 17 shows a safety release lag screw 91 with a projection 63 and receiver 65, and a shear pin 66.

Figure 18:
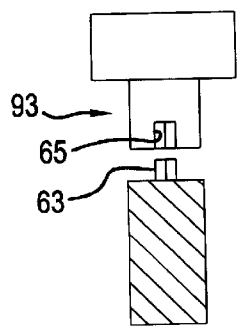
FIG. 18 shows a safety release bolt with a projection on the lower section and a recess in an upper section.

FIG. 18 shows a safety release bolt 93 with male and female projections 63 and 65 reversed.

The complementary projections and recesses may be constructed to fail upon overtorquing to prevent damage to the part or base.

While the invention has been described with reference to specific embodiments, modifications and variations of the invention may be constructed without departing from the scope of the invention, which is defined in the following claims.

I claim:

1. Safety fastener apparatus for preventing injury due to entrapments and entanglements in machinery and installations, comprising fasteners for connecting a part or assembly to a machine or installation, each fastener having first and second sections, the first section having unthreaded walls, and the first and second sections being releasably connected for quick release of the sections and of the part or assembly from the machine or installation on applying a pressure on the fasteners.

2. The apparatus of claim 1, wherein the first and second sections have torque transmitting connections between the sections for withstanding strong torque between the sections during installation and for separating axially upon applying a force to release the part or assembly from the machine or installation.

3. The apparatus of claim 1, further comprising the first section having first and second portions and the second section having third and fourth portions.

4. The apparatus of claim 3, wherein the first portions are formed as heads, and shapes on the heads for receiving a driving device.

5. The apparatus of claim 3, wherein the fourth portions are formed as threaded portions for engaging complementary threaded connectors.

6. The apparatus of claim 3, further comprising complementary connectors in the second and third portions, the complementary connectors comprising projections and receivers in the second portions for releasably engaging the first and second sections.

7. The apparatus of claim 6, wherein the projections are at least one projection from each third portion and the receivers are at least one complementary socket in each second portion for holding the first and second sections together by friction fit.

8. The apparatus of claim 1, further comprising a tool for engaging a connector on the second section and for removing the second section from the machine or installation after separation from the first section.

9. The apparatus of claim 8, wherein the tool is an extraction wrench.

10. The apparatus of claim 1, wherein the fasteners are of plastic material.

11. The apparatus of claim 1, wherein the fasteners are of corrosion-resisting metal.

12. The apparatus of claim 1, wherein the fasteners have a corrosion-resistant coating.

13. Safety fastener apparatus comprising a base, a part for detachably coupling to the base, fasteners having upper and lower sections and an axially releasable, torque transmitting connection between the upper and lower sections for withstanding a strong torque between the upper and lower sections during installation and for easy separation of the sections upon applying axial force, wherein the lower sections further comprise threads for engaging complementary threads in openings in the base, and wherein the upper sections further comprise unthreaded walls and heads for engaging nuts or drivers and preventing passage of the heads through openings in the part coupled to the base.

14. The fastener apparatus of claim 13, wherein the part comprises fastener-receiving openings, and wherein the heads have shapes for receiving driving devices.

15. The fastener apparatus of claim 13, further comprising projections on and complementary sockets in the lower sections and the upper sections for engaging the projections in the sockets and holding the first and second sections together by friction or adhesion.

16. The fastener apparatus of claim 13, further comprising an extraction wrench for removing the lower section after separation from the upper section.

17. The fastener apparatus of claim 13, wherein the fasteners are of plastic material.

18. The fastener apparatus of claim 13, wherein the fasteners are of corrosion-resistant metal.

19. The fastener apparatus of claim 13, wherein the fasteners have a corrosion-resistant coating.

20. Pool, spa and hot tub safety release fasteners for detachably coupling a base of a pool, spa, or hot tub to a grate frame comprising fasteners including upper and lower sections, the lower sections having threads for engaging with threaded fastener-receiving holes in the base of the pool, spa or hot tub, the upper sections having unthreaded walls and radially extended heads for preventing passage of the heads through openings in the grate frame, the heads having shapes for receiving a driver, and axially releasable, torque transmitting connections between the upper and lower sections for withstanding strong torque between the sections required for installing the fasteners in the threaded fastener-receiving holes in the base and for separating upon applying axial force.

21. The fasteners of claim 20, further comprising axial holder in the torque transmitting sections for holding the sections together during installation and for releasing the sections upon excess axial force.

* * * * *